United States Patent [19]

Griffin

[11] Patent Number: 4,575,964

[45] Date of Patent: Mar. 18, 1986

[54] GUN REST

[75] Inventor: Donnie R. Griffin, Emerson, Ark.

[73] Assignee: PKG Trading Company, Inc.

[21] Appl. No.: 603,773

[22] Filed: Apr. 25, 1984

[51] Int. Cl.⁴ .............................................. F41C 29/00
[52] U.S. Cl. ........................................................ 42/94
[58] Field of Search ........................... 42/94; 89/37.04;
224/150, 191, 202; 248/511, 519, 523, 524, 527, 157, 423

[56] References Cited

U.S. PATENT DOCUMENTS

| | | | |
|---|---|---|---|
| 454,300 | 6/1891 | Sproul | 42/94 |
| 879,052 | 2/1908 | Jeranek | 42/94 |
| 1,890,423 | 12/1932 | Teagarden | 42/94 |
| 3,156,062 | 11/1964 | Stevenson et al. | 42/94 |
| 3,225,656 | 12/1965 | Flaherty et al. | 42/94 |

Primary Examiner—Charles T. Jordan
Attorney, Agent, or Firm—Harvey B. Jacobson

[57] ABSTRACT

A portable gun rest of lightweight plastic comprises a pair of oppositely directed U-shaped saddle members at opposite ends respectively of an elongate telescopic support assembly. One saddle member is dimensioned to fit over a user's thigh and the other saddle member is dimensioned to receive the forearm of a rifle or shotgun. A locking pin for the telescopic assembly is carried on the end of a cord which also forms a carrying strap for the gun rest. The device can be used to support various types of guns in various firing positions.

20 Claims, 6 Drawing Figures

GUN REST

BACKGROUND OF THE INVENTION

This invention relates to a portable gun rest which can be used by an individual to support any one of a variety of guns, such as rifles, shotguns and pistols, for example, in any one of a variety of firing positions, and which can be easily transported by the individual in the field with no undue strain.

DESCRIPTION OF PRIOR ART

The following U.S. patents relate to gun rests and the like, none of which, however, include the features of the present invention.

U.S. Pat No. Des. 203,680;
U.S. Pat. No. 167,169;
U.S. Pat. No. 1,890,423;
U.S. Pat. No. 3,156,062;
U.S. Pat. No. 3,390,477.

SUMMARY OF THE INVENTION

A gun rest in accordance with the invention comprises, for example, first and second oppositely directed, substantially U-shaped saddle members at the respective ends of an elongate support assembly. One of the saddle members may, conveniently, be shaped and dimensioned to fit over a user's thigh (when a thigh-supported firing position is required) and the other saddle member may be dimensioned to receive the forearm of a rifle, shotgun or the like.

The support assembly may comprise a pair of telescopic elongate elements with aligned holes and a locking pin which allows the overall height of the gun rest to be adjusted to suit a user's needs. The holes and locking pin may be oriented so as to dispose the respective saddle members in axial alignment. By releasing the locking pin, however, and collapsing the support assembly to its shortest length, the angularity of the saddle members can be adjusted. The locking pin may be carried on a cord secured to one of the telescopic elements and passing through an opening in the other telescopic element so as to form a carrying strap for the gun rest. The entire gun rest can be made in a strong lightweight plastic.

A gun rest in accordance with the invention has various advantageous features. For example, it requires no fastening to the clothing or body of a user when in use. The design of the rest makes it suitable for manufacture in lightweight plastic, making it easy to transport while being robust in use. The gun rest can be used for shooting with either hand, supported on either leg, or braced on the ground when the user is either in a sitting or lying position. It can be laid in the lap or hung on a suitable support when not in use. There are no separate parts to be screwed or fastened together, thereby minimizing the possibility of lost components. The rest is equally applicable for use with long guns, pistols, or cross-bows, and is particularly suitable for use with heavy muzzle-loading guns.

These together with other objects and advantages which will become subsequently apparent reside in the details of construction and operation as more fully hereinafter described and claimed, reference being had to the accompanying drawings forming a part thereof, wherein like numerals refer to like parts throughout.

DESCRIPTION OF PREFERRED EMBODIMENT

Figure 4:
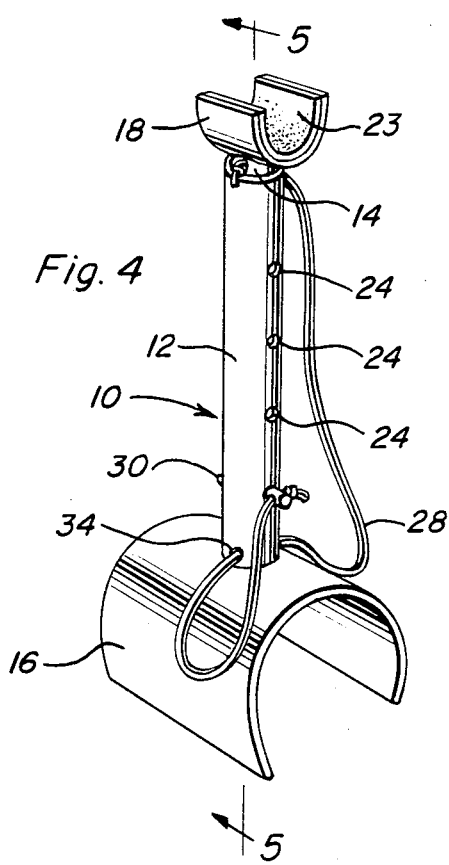
FIG. 4 is an enlarged perspective view of the gun rest.
Figure 6:
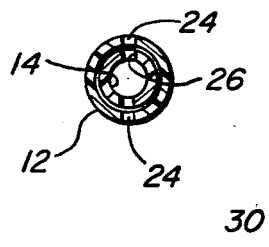
FIG. 6 is a sectional view on line 6—6 of FIG. 5.
Figure 5:
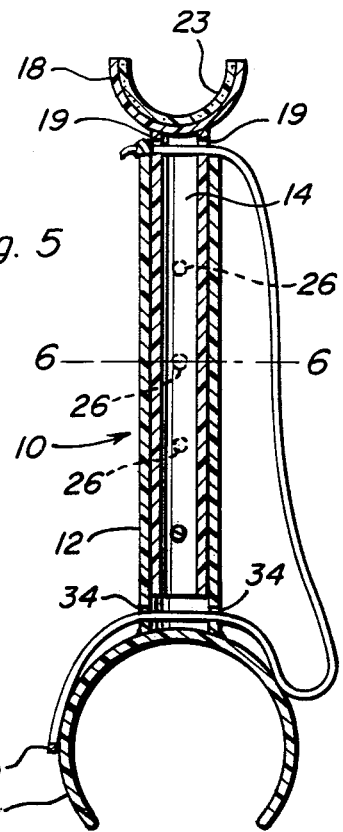
FIG. 5 is a sectional view on line 5—5 of FIG. 4.

Referring initially to FIGS. 4 to 6, there is illustrated a gun rest 10 in accordance with the invention comprising a pair of telescopically disposed tubular support elements 12 and 14, each having a substantially U-shaped saddle member 16 or 18 at its free end. Saddle member 16 may, for example, be shaped and dimensioned to fit snugly over a user's thigh, while saddle member 18 may be shaped and dimensioned to receive the forearm 20 of a rifle 22 or the like (see FIGS. 1 and 2). Saddle member 18 may also be lined with a suitable adherent padding material 23 such as felt, foamed plastic, or the like. The tubular support and saddle members may be formed in a lightweight hard plastic. The height of the respective support members may be about eleven inches. Saddle member 16 may, for example, have a diameter of about five and one-half inches and a length of about six inches, its circumferential extent being slightly greater than a semi-circle whereby the inherent flexibility of the plastic material allows it to grip snugly around a user's thigh. Saddle member 18 may for example have a diameter of about two and one-half inches and a length of about three inches. The circumferential extent of saddle member 18 may be about 180°.

Each of the tubular members is provided with a series of through holes 24, 26, and a cord 28 with a locking pin 30 at its free end is attached to member 14 adjacent saddle member 18, through holes 19 in the tubular member (FIG. 5). The cord is threaded through lateral holes 34 at the base of member 12. The pin can be inserted through selected aligned holes 24, 26 in the respective tubular members to set the height of the rest to that required by a user. It will be noted that the holes 24, 26 are oriented so that when the tubular members are secured together by the locking pin, the saddle members are coaxially aligned. However, if it is necessary to angle the respective saddle members, the pin can be removed and the rest collapsed to its shortest length.

Figure 1:
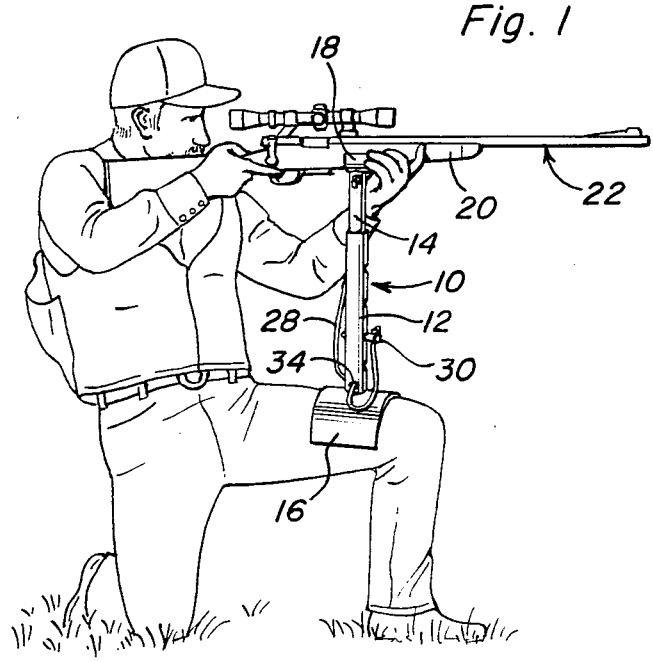
FIG. 1 is a perspective view of a user supporting a rifle on a gun rest, in a kneeling firing position.
Figure 2:
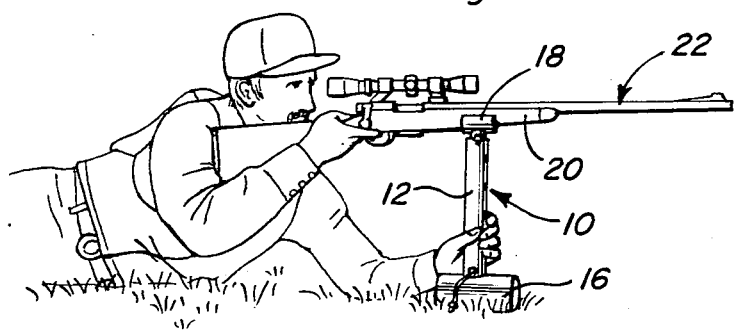
FIG. 2 is a view similar to FIG. 1 showing the user supporting a rifle in a lying down firing position.
Figure 3:
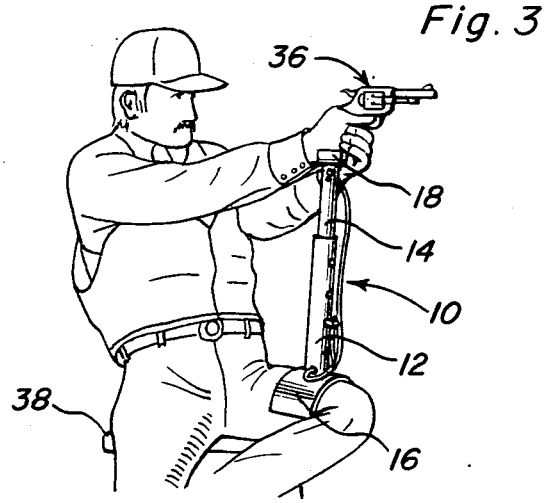
FIG. 3 is a similar view showing the user supporting a pistol on the gun rest.

The gun rest may be used for diverse gun-supporting purposes. For example, FIG. 1 shows the rest being used to support rifle 22 on the user's thigh with the user in kneeling position, FIG. 2 shows the rest being used to support the rifle on the ground with the user in lying position, and FIG. 3 shows the rest being used to support a pistol 36 on the user's thigh with the user seated on a treestand 38 or the like. In FIG. 3, the saddle member 18 is used to support the user's pistol hand. In each case, the rest is adjusted to the user's required height by telescopic adjustment of the tubular members and placement of pin 30 in the requisite holes 24, 26. The gun rest may also be used in applications other than those illustrated, for example for supporting a rifle or shotgun on a user's knee, with the user in seated position, for supporting a rifle, shotgun or pistol on the ground with the user in seated position on the ground. Further, the rest may also be used to support items other than guns, for example crossbows. Thus, while the ensuing claims refer to the article as a portable gun rest, it is to be understood that it is within the scope of the invention that the article also be used for supporting other types of firearms.

When the rest is not in use, it may be transported with cord 28 serving as a shoulder strap, or hung away by means of the cord, with pin 30 preventing the cord being pulled through holes 34 which preferably are of smaller diameter than the pin, thereby preserving a suitable loop in the cord.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A portable gun rest comprising first and second oppositely directed substantially U-shaped saddle members on opposite ends respectively of an elongate support assembly, one of said saddle members being effectively shaped and dimensioned to fit on a user's thigh, and the other of said saddle members being effectively shaped and dimensioned to receive a rifle forearm and the like.

2. The invention of claim 1 wherein the support assembly comprises a pair of elongate telescopically interconnected elements, and means for releasably securing said elements in selected relative positions for adjusting the height of the gun rest.

3. The invention of claim 2 wherein the means for securing said elements is oriented to dispose the saddle members in axial alignment.

4. The invention of claim 3 wherein the elongate elements are mutually rotatable about their longitudinal axes upon release of the securing means to adjust the relative angularity of the saddle members.

5. The invention of claim 2 wherein the securing means comprises serial longitudinally spaced openings in the respective longitudinal elements, and a locking pin insertable therein.

6. The invention of claim 5 wherein the pin is carried on a cord operatively connected with the respective elongate elements so as to form a carrying loop for the gun rest.

7. The invention of claim 6 wherein one end of the cord is attached to one of said elongate elements adjacent its respective saddle member, the other of said elongate elements having an opening therethrough adjacent its respective saddle member, the cord being passed through said opening and having the pin secured at its opposite end.

8. The invention of claim 2 wherein the elongate elements and respective saddle members are formed in a hard lightweight plastic.

9. The invention of claim 1 wherein the other of said saddle members is lined with a padding material.

10. A portable gun rest comprising a pair of oppositely directed substantially U-shaped saddle members carried respectively at opposite ends of a support assembly comprising telescopically interconnected elongate elements having releasable means for securing the elements in different telescopic positions to adjust the height of the gun rest.

11. The invention of claim 10 wherein the saddle members are of different sizes respectively.

12. The invention of claim 11 wherein one of the saddle members is dimensioned and configured resiliently to grip over a user's thigh, and the other saddle member is dimensioned substantially to receive a rifle or shotgun forearm.

13. The invention of claim 12 wherein the other saddle member is padded.

14. The invention of claim 10 wherein the releasable means is configured, when secured, to orient the respective saddle members in axial alignment, and when released, to allow angular adjustments between the saddle members.

15. The invention of claim 14 wherein the securing means comprises serial longitudinally spaced alignable holes formed through the respective elongate elements, and a locking pin for insertion therein.

16. The invention of claim 15 wherein the locking pin is carried at one end of a cord which also provides a carrying loop for the gun rest.

17. A portable gun rest comprising a pair of telescopically interconnected elongate elements with support members at the respective ends thereof, serial longitudinally spaced openings in each of the elements respectively alignable to set the height of the gun rest, and a locking pin insertable in the aligned openings, wherein the locking pin is carried on one end of a cord which is operatively connected to said elements to form a carrying loop for the gun rest.

18. The invention of claim 17 wherein the opposite end of the cord is secured to one of said elongate elements adjacent its respective support member, and the other elongate element has an opening therethrough adjacent its respective support member through which opening the cord is passed.

19. The invention of claim 17 wherein the loop is of sufficient length to form a shoulder strap.

20. The invention of claim 17 wherein the support members comprise U-shaped saddle members of different sizes respectively.

* * * * *